US012529436B1

(12) United States Patent
Cowen

(10) Patent No.: US 12,529,436 B1
(45) Date of Patent: Jan. 20, 2026

(54) FITTING

(71) Applicant: Mueller Industries, Inc., Collierville, TN (US)

(72) Inventor: Jeston S. Cowen, Memphis, TN (US)

(73) Assignee: Mueller Industries, Inc., Collierville, TN (US)

( * ) Notice: Subject to any disclaimer, the term of this patent is extended or adjusted under 35 U.S.C. 154(b) by 0 days.

(21) Appl. No.: 18/818,065

(22) Filed: Aug. 28, 2024

(51) Int. Cl.
*F16L 19/025* (2006.01)
*F16L 19/02* (2006.01)
*F16L 37/091* (2006.01)

(52) U.S. Cl.
CPC ......... *F16L 19/025* (2013.01); *F16L 19/0218* (2013.01); *F16L 37/091* (2013.01)

(58) Field of Classification Search
CPC . F16L 19/0206; F16L 19/0231; F16L 19/025; F16L 19/028; F16L 19/0283; F16L 19/05; F16L 37/091; F16L 13/142
USPC ........................................ 285/387, 388, 382
See application file for complete search history.

(56) References Cited

U.S. PATENT DOCUMENTS

| | | | | | |
|---|---|---|---|---|---|
| 2,441,344 | A | * | 5/1948 | Bosworth | F16L 19/028 285/321 |
| 3,012,581 | A | * | 12/1961 | Wilson | F16L 19/0231 285/302 |
| 3,113,792 | A | * | 12/1963 | Brown | F16L 19/0231 285/388 |
| 5,560,661 | A | * | 10/1996 | Babel | F16L 19/0218 285/329 |
| 7,712,797 | B2 | * | 5/2010 | Lum | F16L 19/025 285/388 |
| 8,001,995 | B2 | * | 8/2011 | Molloy | F16L 37/26 285/388 |
| 10,047,884 | B2 | * | 8/2018 | Taylor | F16L 37/091 |
| 2006/0175835 | A1 | * | 8/2006 | Kronmeyer | F16L 19/0231 285/387 |
| 2009/0146418 | A1 | * | 6/2009 | Noto | F16L 19/025 285/133.4 |

* cited by examiner

Primary Examiner — David Bochna
(74) Attorney, Agent, or Firm — Harness, Dickey & Pierce, P.L.C.

(57) ABSTRACT

A fitting configured to connect an inlet or outlet of a fluid reservoir to a conduit, wherein the inlet or outlet has a flared end having a diameter that is greater than a tube body of the inlet or the outlet. The fitting includes a housing having a first open end configured for receipt of the inlet or the outlet and a second open end configured for receipt of the conduit; a retaining nut configured to mate with first open end; and a slip washer configured to be sandwiched between the first open end of the housing and the retaining nut, wherein the slip washer is horseshoe-shaped and is configured to restrain movement of the fitting relative to the inlet or outlet.

18 Claims, 10 Drawing Sheets

FITTING

FIELD

The present disclosure relates to a fitting for connecting a source of fluid to a pipe or conduit.

BACKGROUND

This section provides background information related to the present disclosure which is not necessarily prior art.

It is common in the heating, ventilation, and air conditioning (HVAC) industry for various features of the HVAC system to have pipes or conduits that have flared ends that need to be connected to other pipes or conduits of the HVAC system. The pipes or conduits that have flared ends are designed for receipt of another pipe or conduit, and then the two are welded or brazed to one another.

Alternatively, if welding or brazing equipment or materials are not available, it may be necessary to use a fitting to connect the conduits. In such a case, however, the fitting may not have an end that is configured for receipt of the flared end and the installer may opt to cut off the flared end. This may be undesirable from the standpoint that this additional step is time consuming, and also requires that the remaining portion of the pipe having the flared end removed be finished and deburred before attaching the fitting to the pipe.

SUMMARY

This section provides a general summary of the disclosure, and is not a comprehensive disclosure of its full scope or all of its features.

According to a first aspect of the present disclosure, there is provided a fitting configured to connect an inlet or outlet of a fluid reservoir to a conduit, wherein the inlet or outlet has a flared end having a diameter that is greater than a tube body of the inlet or the outlet. The fitting includes a housing having a first open end configured for receipt of the inlet or the outlet and a second open end configured for receipt of the conduit; a retaining nut configured to mate with first open end; and a slip washer configured to be sandwiched between the first open end of the housing and the retaining nut, wherein the slip washer is horseshoe-shaped and is configured to restrain movement of the fitting relative to the inlet or outlet.

According to the first aspect, the slip washer includes a first end and a second end that are separated by a gap having a distance that corresponds to a diameter of the tube body of the inlet or the outlet, and the distance is less than a diameter of the flared end of the inlet or the outlet.

According to the first aspect, the first end includes a threaded surface that mates with an internally threaded surface of the retaining nut.

According to the first aspect, the retaining nut includes a radially inwardly extending annular flange that is configured to contact the slip washer when the slip washer is sandwiched between the first open end of the housing and the retaining nut.

According to the first aspect, the radially inwardly extending annular flange defines a through-hole having a diameter that is greater than the diameter of the flared end of the inlet or the outlet.

According to the first aspect, the housing includes an interior surface that, at the first open end, includes a first cylindrical section and a second cylindrical section that are separated by a radially outwardly recessed section that is configured for receipt of at least one annular seal member.

According to the first aspect, the second open end of the housing is configured to be crimped to secure the conduit positioned therein to the housing.

According to the first aspect, the second open end includes at least one outwardly extending ridge at an exterior surface of the housing and a correspondingly shaped recess at an interior surface of the housing, wherein the recess is configured for receipt of an annular seal member.

According to the first aspect, the second open end includes a threaded section, a first annular shoulder located inboard from the threaded section that extends radially inward, and a second annular shoulder located inboard from the first annular shoulder that extends radially inward; a grip ring having a plurality of flexible teeth positioned within the housing and configured to be seated against the second annular shoulder, the flexible teeth being configured to grip an exterior surface of the conduit; a bonnet configured to be seated against the first annular shoulder and having an exterior threaded surface that is configured to mate with the threaded section of the bore; a bonnet washer configured to be positioned between the grip ring and the bonnet; and a pair of seal members positioned between the bonnet washer and the bonnet that are configured to sealingly engage with the exterior surface of the conduit.

According to the first aspect, the first annular shoulder includes an annular nub that extends axially outward therefrom, the annular nub being configured to deform when bonnet is seated against the first annular shoulder.

According to a second aspect of the present disclosure, there is provided a fitting configured to connect a tube having a tube body and a flared end having a diameter that is greater than that of the tube body with a conduit, wherein the fitting includes a housing having a first open end configured for receipt of at least the flared end of the tube and a second open end configured for receipt of the conduit; a retaining nut configured to mate with first open end; and a slip washer configured to be sandwiched between the first open end of the housing and the retaining nut, wherein the slip washer is horseshoe-shaped and is configured to restrain movement of the fitting relative to the tube.

According to the second aspect, the slip washer includes a first end and a second end that are separated by a gap having a distance that corresponds to the diameter of the tube body, and the distance is less than the diameter of the flared end of the tube.

According to the second aspect, the first end includes a threaded surface that mates with an internally threaded surface of the retaining nut.

According to the second aspect, the retaining nut includes a radially inwardly extending annular flange that is configured to contact the slip washer when the slip washer is sandwiched between the first open end of the housing and the retaining nut.

According to the second aspect, the radially inwardly extending annular flange defines a through-hole having a diameter that is greater than the diameter of the flared end of the tube.

According to the second aspect, the housing includes an interior surface that, at the first open end, includes a first cylindrical section and a second cylindrical section that are separated by a radially outwardly recessed section that is configured for receipt of at least one annular seal member.

According to the second aspect, the second open end of the housing is configured to be crimped to secure the conduit positioned therein to the housing.

According to the second aspect, the second open end includes at least one outwardly extending ridge at an exterior surface of the housing and a correspondingly shaped recess at an interior surface of the housing, wherein the recess is configured for receipt of an annular seal member.

According to the second aspect, the second open end includes a threaded section, a first annular shoulder located inboard from the threaded section that extends radially inward, and a second annular shoulder located inboard from the first annular shoulder that extends radially inward; a grip ring having a plurality of flexible teeth positioned within the housing and configured to be seated against the second annular shoulder, the flexible teeth being configured to grip an exterior surface of the conduit; a bonnet configured to be seated against the first annular shoulder and having an exterior threaded surface that is configured to mate with the threaded section of the bore; a bonnet washer configured to be positioned between the grip ring and the bonnet; and a pair of seal members positioned between the bonnet washer and the bonnet that are configured to sealingly engage with the exterior surface of the conduit.

According to the second aspect, the first annular shoulder includes an annular nub that extends axially outward therefrom, the annular nub being configured to deform when the bonnet is seated against the first annular shoulder.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
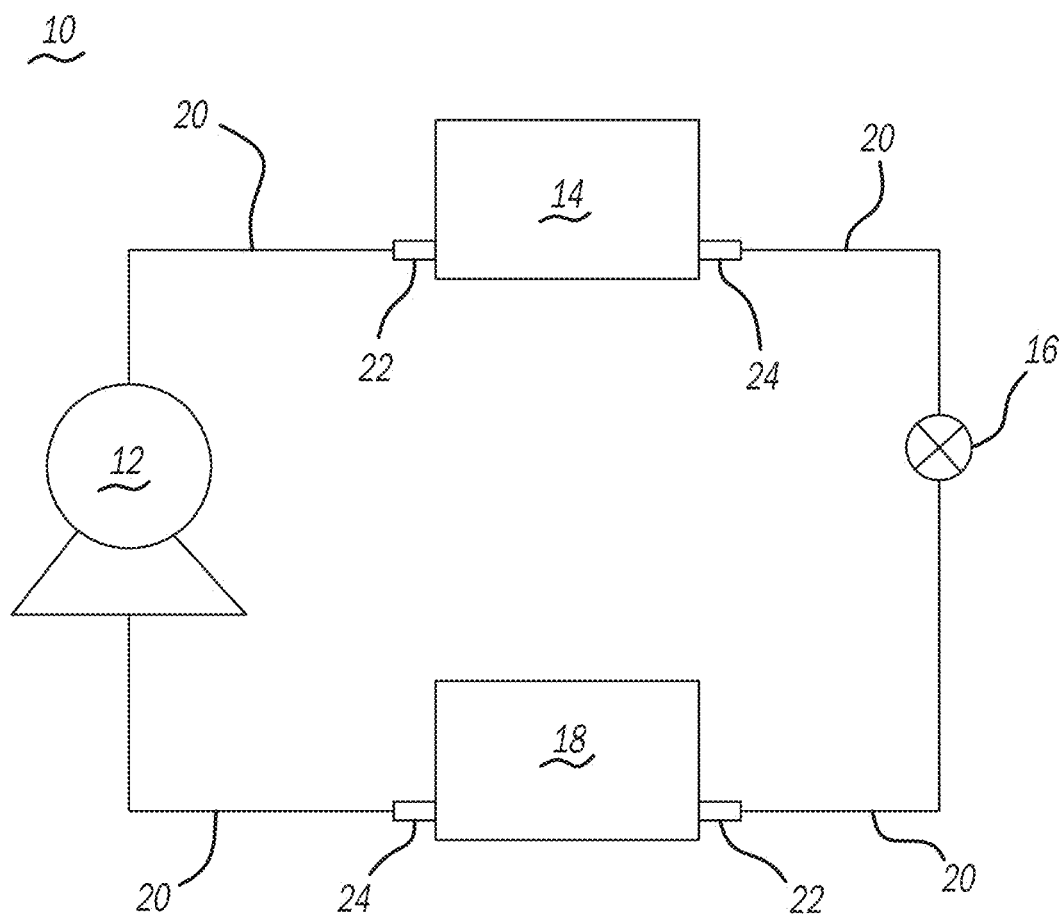
FIG. 1 is a schematic representation of an example HVAC system that may include a fitting assembly according to an aspect of the present disclosure.
Figure 2:
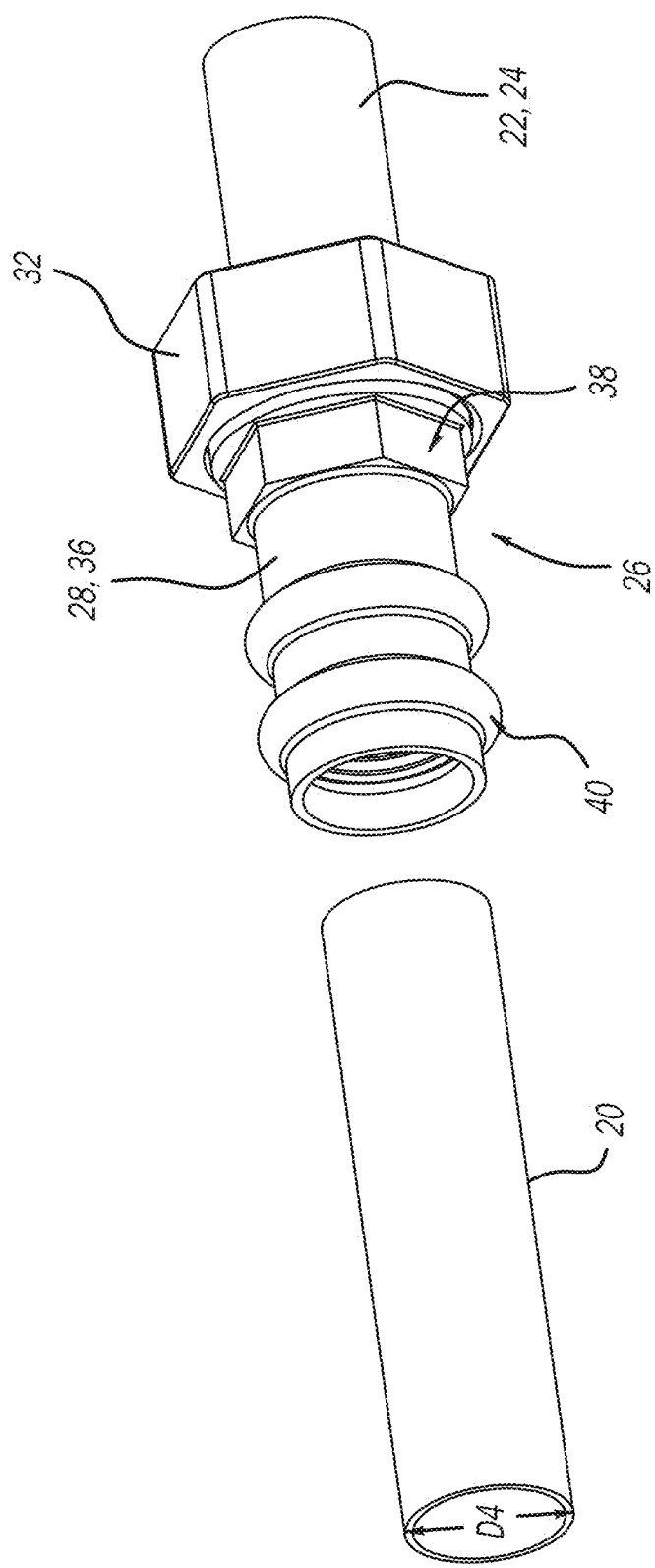
FIG. 2 is an isometric perspective view of an example fitting assembly according to a principle of the present disclosure.
Figure 3:
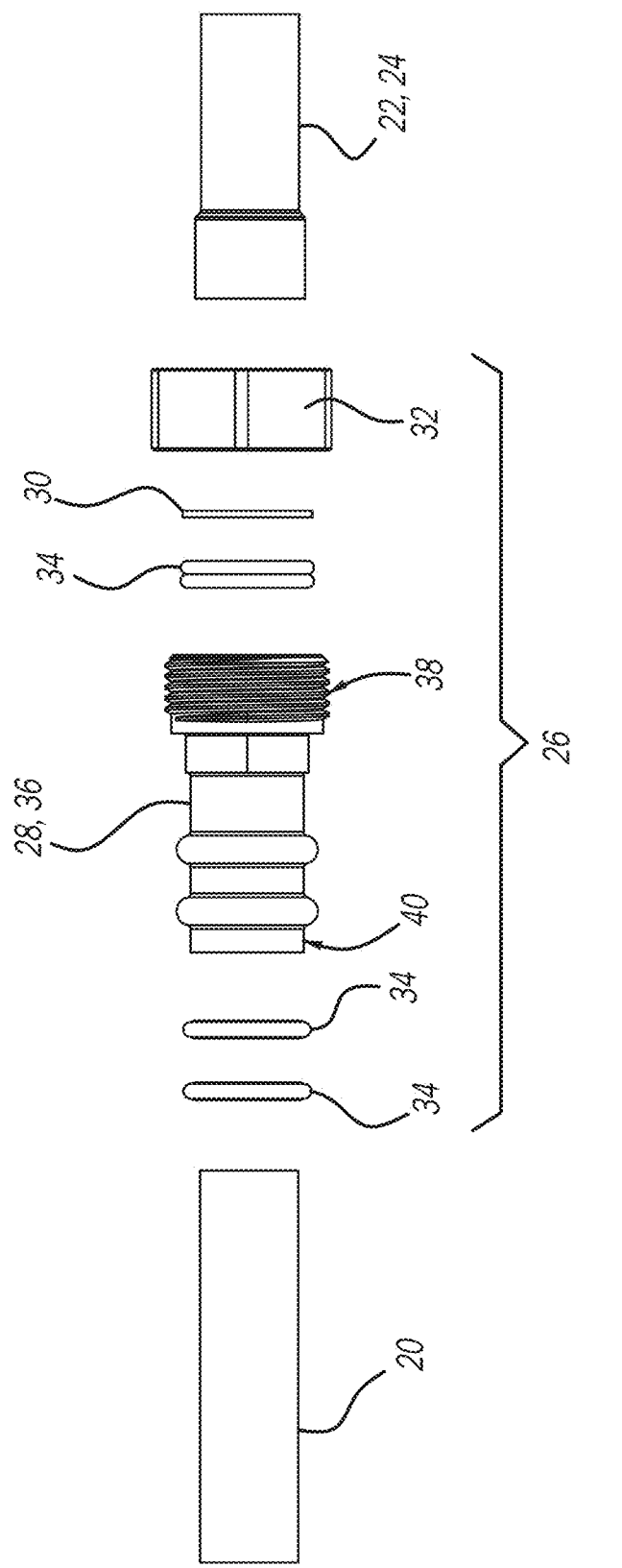
FIG. 3 is an exploded perspective view of the example fitting assembly illustrated in FIG. 2.

FIG. 1 is a schematic illustration of an example circuit 10 that may be used, for example, in a residential or commercial heating, ventilation, and air conditioning (HVAC) system. Circuit 10 may include a compressor 12, a first fluid reservoir or heat exchanger (e.g., condenser) 14, an expansion valve or capillary tube 16, and a second fluid reservoir or heat exchanger (e.g., evaporator) 18 that are in fluid communication with each other using pipes or conduits 20. In addition, it should be noted that first and second heat exchangers 14 and 18 each include an inlet 22 and an outlet 24 that may be unitary with a heat exchanger coil (not shown) located within the heat exchangers 14 and 18. Inlet 22 and outlet 24 are commonly known as being a "stub out."

It has been customary to connect conduits 20 to the inlets 22 and outlets 24 of the heat exchangers 14 and 18 by welding or brazing. While these methods may be satisfactory for providing a leak-free connection, these connection methods may be unsatisfactory from the standpoint that if a conduit 20 connected to one of the heat exchangers 14 and 18 needs to be replaced, or if the heat exchangers 14 and 18 themselves need to be replaced, it will be necessary to cut either the conduit 20, inlet 22, or outlet 24, replace the component that needs to be replaced, and then re-weld or braze the components back together, which can be time-consuming and wasteful of materials. Accordingly, the present disclosure provides a fitting assembly 26 (FIGS. 2-6) that can easily and quickly connect conduit 20 to either the inlet 22 or outlet 24.

Now referring to FIGS. 2-5, it can be seen that fitting assembly 26 includes a housing 28, a slip washer 30, a retaining nut 32, and a plurality of annular elastomeric seal members or O-rings 34. Housing 28 includes a hollow body 36 having a first end 38 configured for receipt of the inlet 22 or outlet 24, and an opposite second end 40 configured for receipt of conduit 20. Hollow body 36 may be formed of a rigid metal material such as copper, brass, or any other rigid metal material known to one skilled in the art. Preferably, the material selected for hollow body 36 is resistant to corrosion, and resistant to exposure to fluids such as refrigerants that may be used in HVAC circuit 10.

Figure 4:
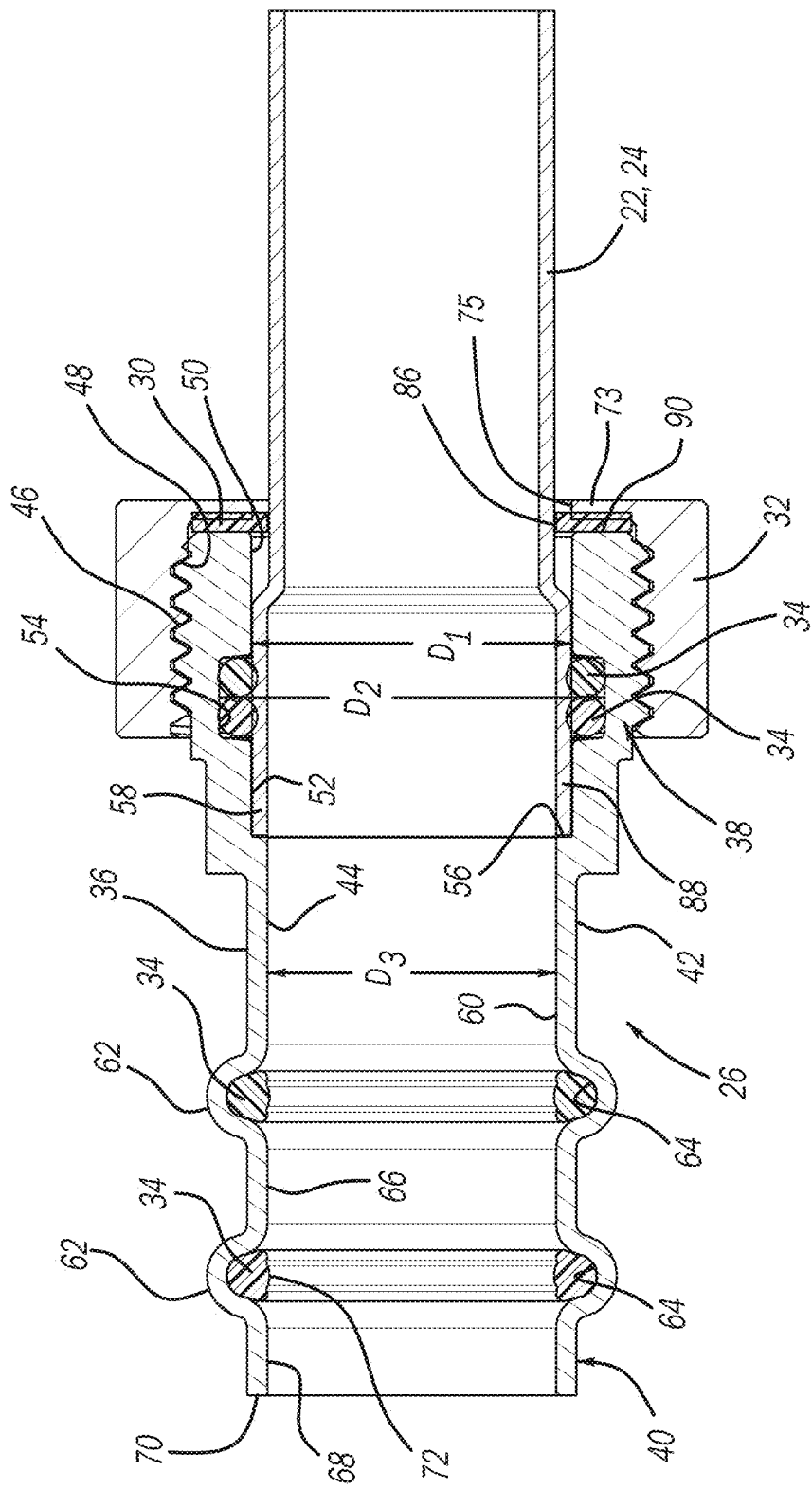
FIG. 4 is a cross-sectional view of the example fitting assembly illustrated in FIG. 2.

As best shown in FIG. 4, hollow body 36 includes an exterior surface 42 and an interior surface 44. Exterior surface 42 at first end 38 includes a threading 46 that mates with a threaded interior surface 48 of retaining nut 32. Interior surface 44 at first end 38 includes a first cylindrical section 50 and a second cylindrical section 52 that each have the same diameter D1, and are separated by a radially outwardly recessed section 54 that is configured for receipt of at least one of the seal members 34 and has a diameter D2 that is greater than D1. Although only a single seal member 34 is necessary, it may be desirable for recessed section 54 to be configured to support a pair of seal members 34 to provide a greater amount of sealing between the fitting assembly 26 and inlet 22 or outlet 24. Second cylindrical section 52 terminates at a radially inwardly extending shoulder 56 that serves as a stop for a terminal end 58 of inlet 22 or outlet 24. A third cylindrical section 60 extends further into body 36 from shoulder 56, and has a diameter D3 that is less than diameter D1. The diameter D3 may be approximately the same as an outer diameter D4 of conduit 20.

In the illustrated embodiment, second end 40 of hollow body 36 includes a pair of circumferential outwardly extending ridges 62 at exterior surface 42 and a pair of correspondingly shaped recesses 64 at interior surface 44, wherein recesses 64 are configured for receipt of one of the annular seal members 34. A fourth cylindrical section 66 extends between recesses 64 having diameter D3. A fifth cylindrical section 68 having diameter D3 extends between a terminal end 70 of second end 40 and one of the recesses 64. When conduit 20 is inserted into second end 40 and past seal members 34 located in recesses 64, a crimping tool (not shown) may be located over ridges 62 and the second end 40 crimped to rigidly secure and provide a fluid-tight seal between housing 28 and conduit 20, as is known in the art.

Seal members 34, as noted above, are annular elastomeric members that may be formed of rubber or some other polymeric material that can compress when engaged with an outer surface of either conduit 20 or inlet/outlet 22, 24. A cross-sectional shape of seal members 34 may be circular (like the seal members 34 provided in recessed section 54), but the present disclosure should not be limited thereto. In this regard, the seal members 34 provided in recesses 64 may have a hemispherical-shaped cross-section having a radially inwardly extending lip 72. Other cross-sectional shapes are also contemplated including, for example, X-cross-sectionally-shaped annular seals, without limitation.

Retaining nut 32 may be formed of materials similar to or the same as housing 28. That is, retaining nut 32 may be formed of materials such as copper, brass, or any other rigid metal material known to one skilled in the art that is resistant to corrosion, and resistant to exposure to fluids such as refrigerants that may be used in HVAC circuit 10. Retaining nut 32 is hollow hexagonal member that, as noted above, includes threaded interior surface 48 that mates with threading 46 of hollow body 36 of housing 28. A radially inwardly extending flange 73 is formed at one end of retaining nut 73 defining a through-hole 75 that is sized to correspond to diameter D1, which is the same as a diameter of flared end 88 of inlet 22 or outlet 24.

Figure 5:
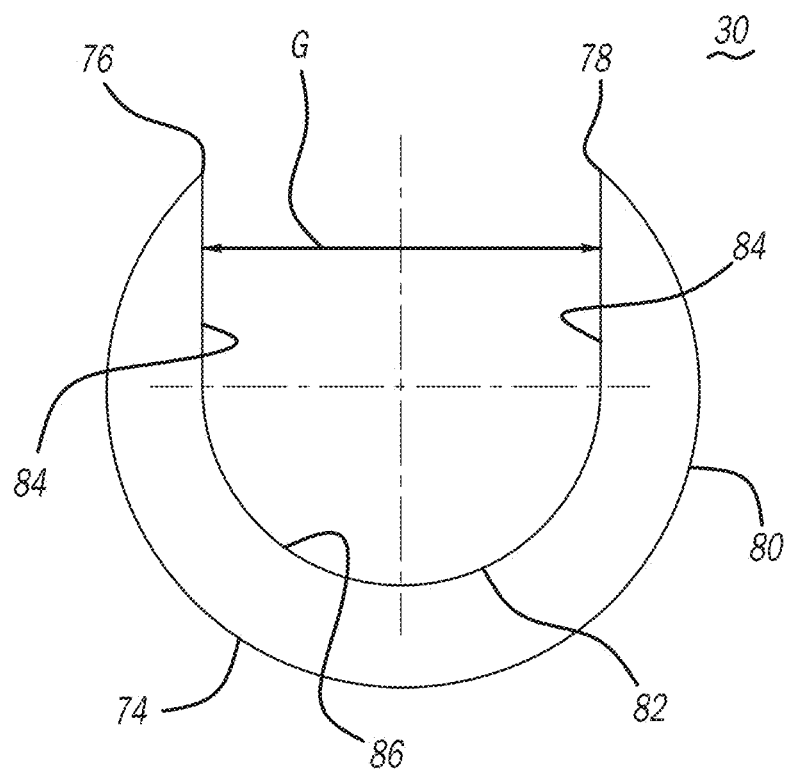
FIG. 5 is a perspective view of a slip washer that is part of the example fitting assembly illustrated in FIGS. 2-4.

As best shown in FIG. 5, slip washer 30 is a horseshoe-shaped disc 74 having first end 76 and an opposite second end 78 that are separated by a gap G that is sized to accommodate inlet 22 or outlet 24. Slip washer 30 includes a circular outer peripheral surface 80 and an interior surface 82 that is configured to permit inlet 22 or outlet 24 to seat therein. Interior surface 82 includes a pair of linear sections 84 that transition to a semi-circle shaped section 86. When slip washer 30 is sandwiched between retaining nut 32 and first end 38 of housing 28, slip washer 30 is configured to restrain movement of fitting assembly 26 relative to inlet 22 or outlet 24 as will be described in more detail below.

Inlet 22 and outlet 24 are tube-shaped bodies that may have a flared end 88. In general, diameter D1 of housing 28 is selected to correspond to the diameter of flared end 88 so that terminal end 58 of inlet 22 or outlet 24 can abut against shoulder 56 when housing 28 is placed over inlet 22 or outlet 24.

Flared end 88 has typically been provided so that conduit 20, which has a similar diameter to the tube-shaped body of inlet 22 or outlet 24 may be inserted into the flared end 88 and then secured therein by welding or brazing. Alternatively, if a conventional fitting were used to connect conduit 20 and inlet 22 or outlet 24, an installer of the fitting would cut the flared end 88 off the inlet 22 or outlet 24 before attaching the fitting and then crimping the fitting to the inlet or outlet tube. This was undesirable from the standpoint that removing the flared end 88 was time consuming because, in addition to the time required to remove the flared end 88, the process also required that the sharp edges of the inlet or outlet tube that remained after removing the flared end 88 had to be processed so that the sharp edges would not potentially damage a seal located in the fitting. In addition, removing the flared end 88 could potentially nullify any warranty that may exist on the heat exchanger 14 or 18.

The fitting assembly 26 according to the present disclosure negates the need for welding or brazing, and also negates the need to potentially remove the flared end 88 of the inlet 22 or outlet 24. In this regard, to attach fitting assembly 26 to inlet 22 or outlet 24, retaining nut 32 is detached from housing 28 and slid over inlet 22 or outlet 24. Housing 28 is then located over flared end 88 and pushed back relative to inlet 22 or outlet 24 until terminal end 58 abuts against shoulder 56 located within fitting body 36. Then, slip washer 30 is placed over inlet 22 or outlet 24 such that inlet 22 or outlet 24 seats against interior surface 82, and slip washer 30 is then slid forward to abut against an abutment surface 90 of first end 38 of housing 28. Notably, the distance of gap G between first end 76 and second end 78 corresponds to a diameter of the tube body of the inlet 22 or outlet 24, and is less than a diameter of flared end 88. Lastly, retaining nut 32 is slid forward and then threadingly mated with housing 28 such that slip washer 30 is sandwiched between abutment surface 90 of housing 28 and flange 73 of retaining nut 32. Due to the distance of gap G being less than a diameter of flared end 88 of inlet 22 or outlet 24, slip washer 30 when sandwiched between abutment surface 90 of housing 28 and flange 73 of retaining nut 32 can restrict movement of fitting assembly 26 relative to inlet 22 or outlet 24.

After attaching fitting assembly 26 to inlet 22 outlet 24, conduit 20 may be inserted into second end 40 of housing 28 and past seal members 34. Then, a crimping tool (not shown) may be used to compress annular ridges 62 to rigidly attach housing 28 to conduit 20. Thus, conduit 20 may be placed in fluid communication with inlet 22 or outlet 24 of one of the heat exchangers 14 or 18 of circuit 10 without welding or brazing, without removing the flared end 88 of the inlet 22 or outlet 24, and in a quick and efficient manner.

Figure 6:
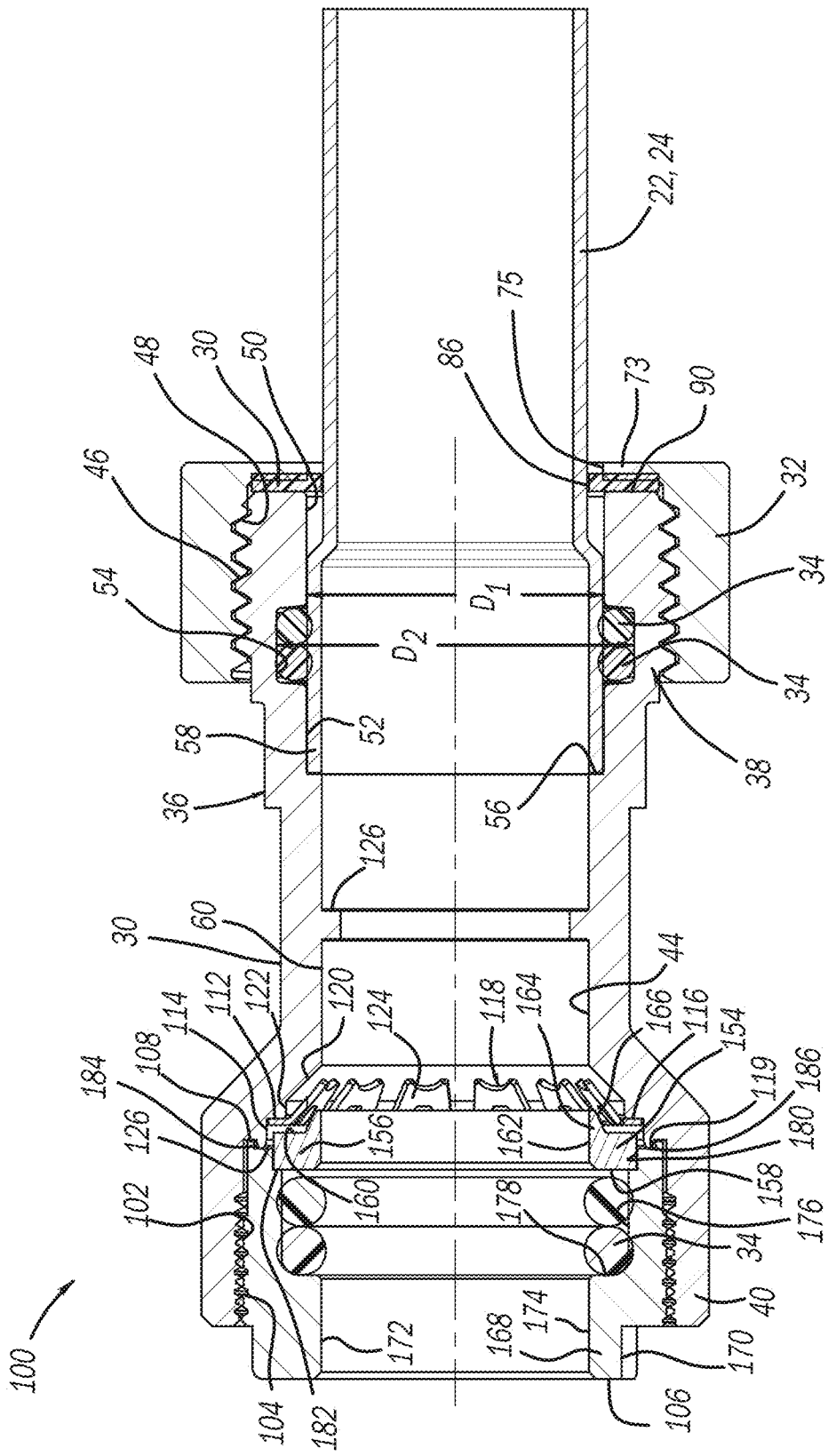
FIG. 6 is a cross-sectional view of another example fitting assembly according to a principle of the present disclosure.

While fitting assembly 26 has been described above as having a second end 40 that may be crimped using a crimping tool to secure fitting assembly 26 to conduit 20, it should be understood that the present disclosure should not be limited thereto. FIG. 6 illustrates a fitting assembly 100 that is similar to the fitting assembly 26 described above, but second end 40 includes features that secure conduit 20 therein without the need to crimp the second end 40 to rigidly attach the fitting assembly 100 to conduit 20. Features that are common between fitting assembly 26 and fitting assembly 100 will be referred to using the same reference numbers.

At second end 40 of fitting assembly 100, interior surface 44 includes a threaded surface 102 that is configured to mate with a threaded end 104 of a bonnet 106. A first annular shoulder 108 that extends radially inward is located inboard from threaded surface 102. An annular nub 110 is formed on first annular shoulder 108 that extends axially outward from shoulder 108 in a direction back toward the threaded surface 102. Nub 110 is a sealing feature that is configured to deform when bonnet 106 is mated with threaded surface 102. In other words, nub 110 is a crush seal that assists in ensuring a leak-proof seal when conduit 10 is mated with fitting assembly 100 and secured by bonnet 106.

Inboard from first annular shoulder 108 is a second annular shoulder 112. A first axially extending surface 114 connects first annular shoulder 108 to second annular shoulder 112. Second annular shoulder 112 is configured to function as a seat 116 for an annular lip of a grip ring 118.

Inboard from second annular shoulder 112 is a radially inwardly extending tapered surface 120. A second axially extending surface 122 extends between second annular shoulder 112 and tapered surface 120. Tapered surface 120 is angled to account for angled teeth 124 that extend radially inwardly from the annular lip of grip ring 118. That is, as will be described in more detail later, when conduit 20 is inserted into fitting assembly 100, an exterior surface of conduit 20 will contact the teeth 124 and bend the teeth 124 in the inboard direction. Tapered surface 120 permits the teeth 124 to bend without damage thereto. That is, as teeth 124 bend in the inboard direction when conduit 20 is inserted into fitting assembly 100, there is the potential for teeth 124 to contact tapered surface 120. Because surface 120 is tapered, however, any contact between the tapered surface 120 and the teeth 118 will not damage the teeth 118 such that a reliable grip between the teeth 118 and the exterior surface of the conduit 20 will be maintained. Third cylindrical section 60 is located inboard from tapered surface 120, which may include an annular radially inwardly extending protrusion 126 that acts as a stop that may be abutted with a terminal end of the conduit 20 when conduit 20 is inserted into fitting 10.

Figure 7:
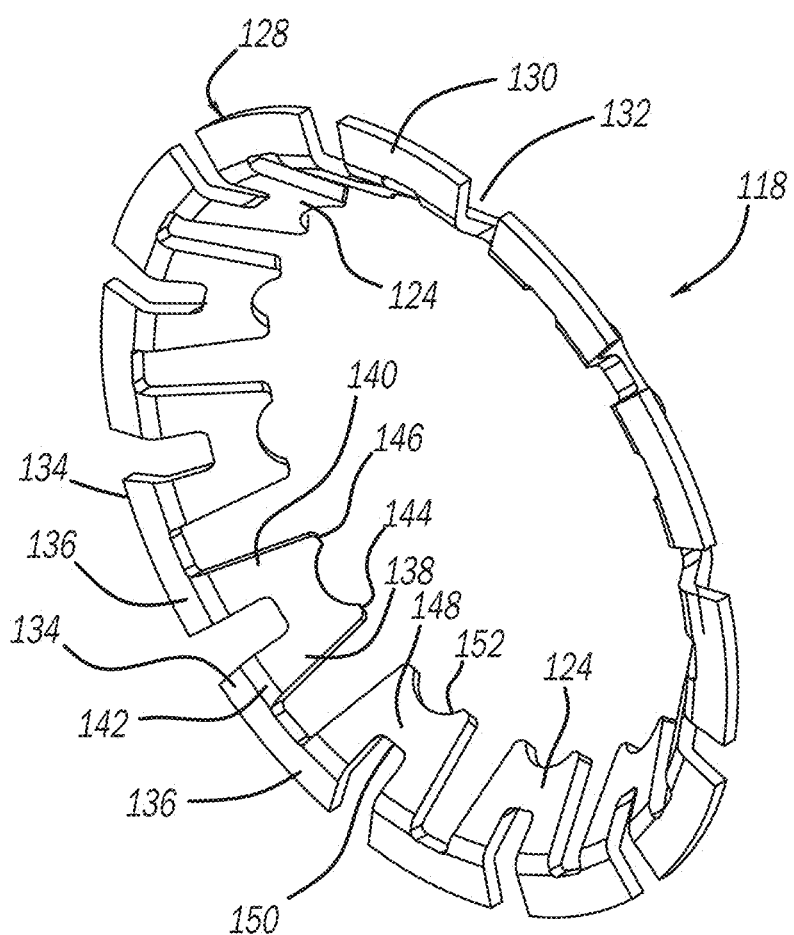
FIG. 7 is a perspective view of a grip ring that is part of the example fitting assembly illustrated in FIG. 6.
Figure 8:
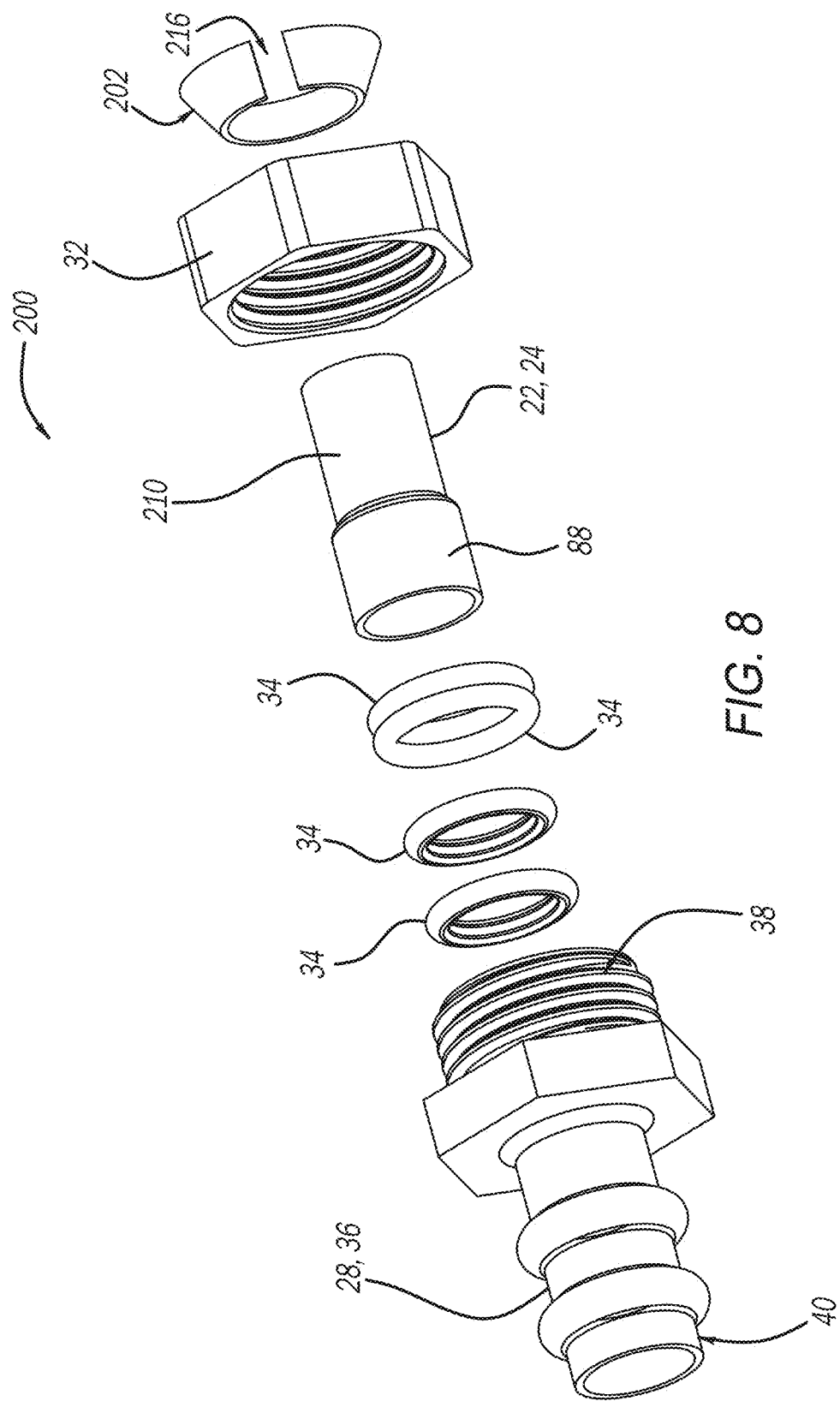
FIG. 8 is an exploded perspective view of another example fitting assembly according to a principle of the present disclosure
Figure 9:
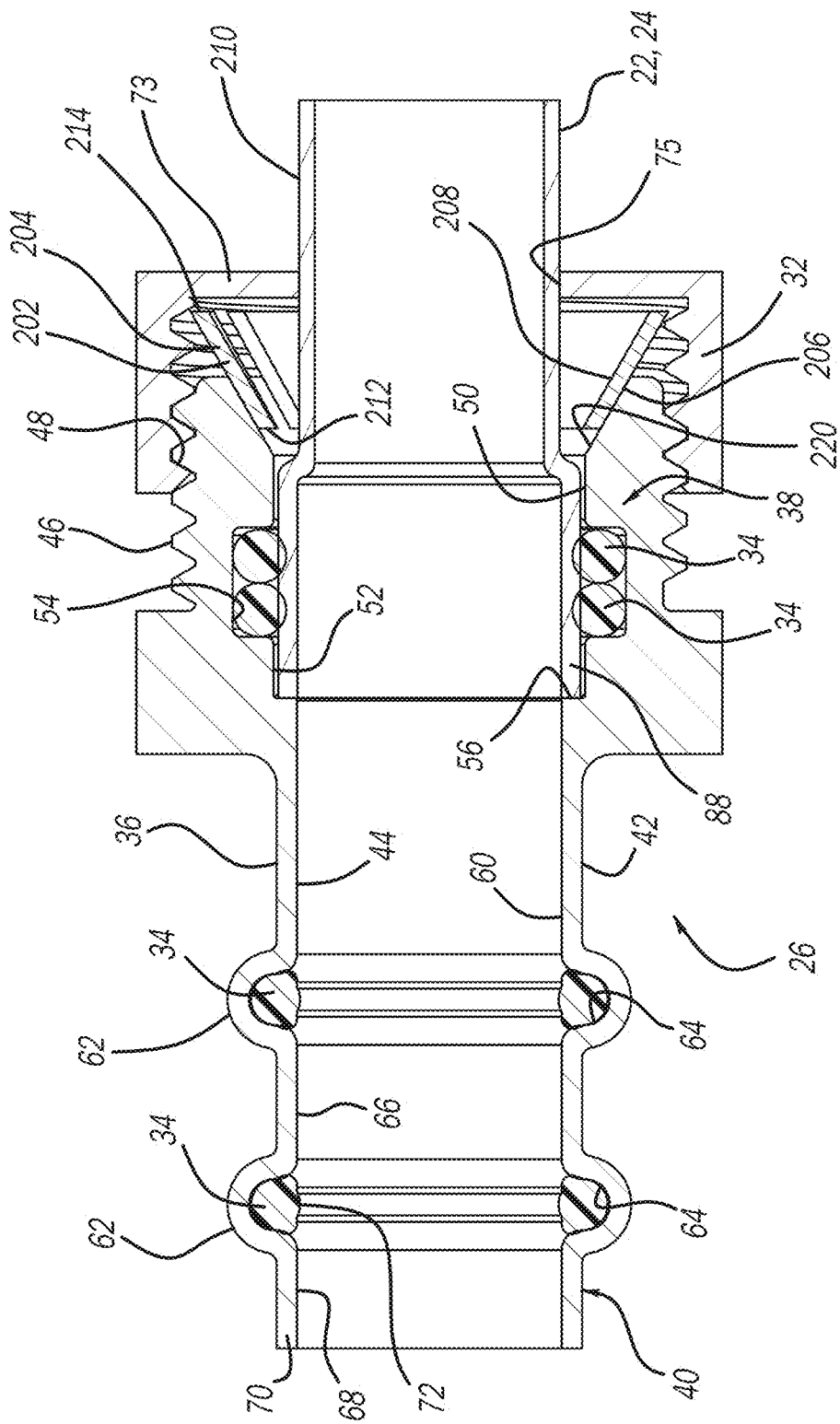
FIG. 9 is a cross-sectional view of the example fitting assembly illustrated in FIG. 8.
Figure 10:
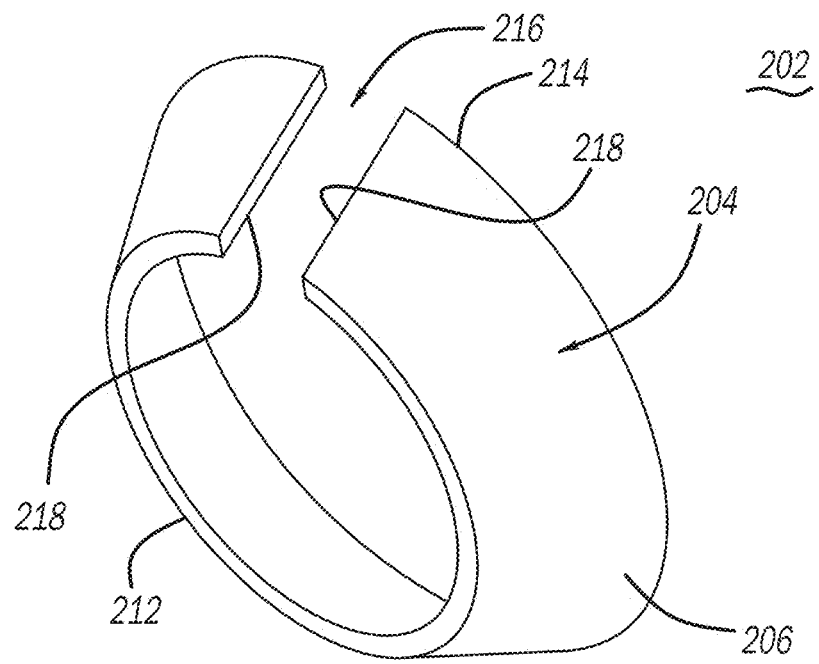
FIGS. 10 and 11 are perspective views of a ferrule that is part of the example fitting assembly illustrated in FIG. 8.
Figure 11:
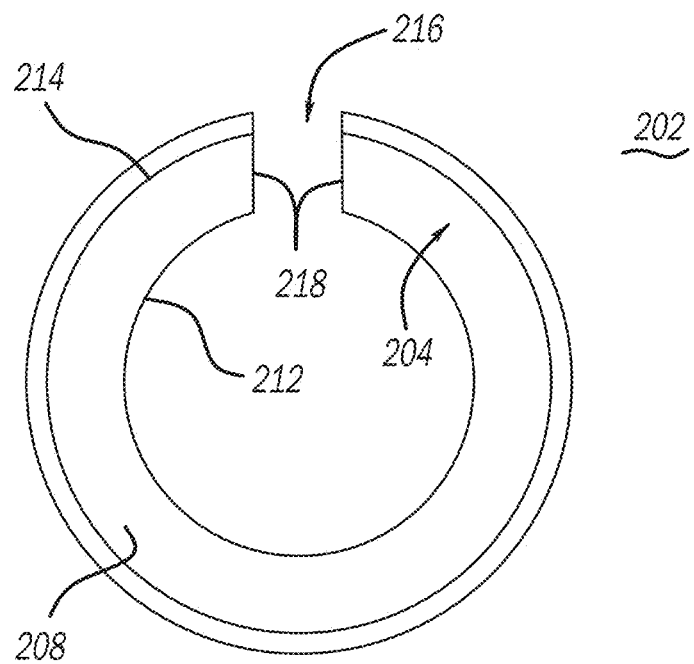

Now referring to FIG. 7, grip ring 118 will be described in more detail. Grip ring 118 includes an annular lip 128 and a plurality of teeth 124. In the illustrated embodiment, annular lip 128 may include a plurality of spaced-apart circumferential sections 130 rather than being formed as a continuous annular ring. Circumferential sections 130 are separated by spaces 132. While grip ring 118 preferably includes circumferential sections 130 separated by spaces 132, it should be understood that annular lip 128 may be continuously formed without departing from the scope of the present disclosure.

Circumferential sections 130 include a first end 134 and a second end 136. Each tooth 124 includes a first leg 138 that extends outward from first end 134 and a second leg 140 that extend outward from second end 136. First and second legs 138, 140 each include a proximal end 142 connected to circumferential section 130 and a distal end 144 that defines a biting surface 146 that is configured to "bite" the exterior surface of conduit 20. A connection leg 148 connects first leg 138 and second leg 140. Connection leg 148 includes a linear surface 150 that faces annular lip 128 and a radiused surface 152 that faces away from annular lip 128. Radiused surface 152 connects the biting surfaces 146 that are formed at the distal end 144 of each of the first leg 138 and the second leg 140. Because each tooth 118 includes a pair of biting surfaces 146, additional touch points between the grip ring 118 and the exterior surface of conduit 20 are created that improves the retention strength of the grip ring 118.

It should be understood that in smaller-diameter fittings 100 that are configured for use with smaller-diameter conduits 20, each component of the fitting 100 is smaller in size, including grip ring 118. In these instances, grip ring 118 may not necessarily include a radiused surface 152 that connects a pair of biting surfaces 146. In contrast, first and second legs 138, 140 may be angled toward each other to form a substantially triangular-formed tooth (not shown) and an apex of the tooth defines the biting surface 146. Notwithstanding the lack of a radiused surface 152, the linear surface 150 may remain between the legs 138 and 140 if desired.

Again referring to FIG. 6, a bonnet washer 154 is positioned between grip ring 118 and bonnet 106. Bonnet washer 154 includes a ring-shaped body 156 having a first annular surface 158 that faces bonnet 106 and is configured be engaged with bonnet 106, a second annular surface 160 that faces grip ring 118 and is configured to engage with annular lip 128 of grip ring 118, and a cylindrical surface 162 that is configured to act as a bearing surface for the exterior surface of conduit 20 when conduit 20 is mated with fitting 100. An axially inwardly extending wedge 164 extends outward from second annular surface 160. Wedge 164 is defined by a portion of cylindrical surface 162 and an angled surface 166 that is configured to contact teeth 124 of grip ring 118.

Bonnet 106 is generally a cylindrical member that is threaded at 104 such that bonnet 106 may threadingly engage with threaded surface 102 of hollow body 36. Extending outward from threaded end 104 is an annular protrusion 168 having a plurality of gripping surfaces 170 that are configured to be engaged with a wrench or some other type of tool to rotate bonnet 106 relative to hollow body 36 to ensure a tight threaded connection between bonnet 106 and hollow body 36.

Bonnet 106 includes an interior surface 172. Interior surface 172 includes a first cylindrical section 174 as it extends from annular protrusion 168 in a direction toward sealing members 34. Interior surface 172 also includes a second cylindrical section 176 having a diameter that is greater than the diameter of the first cylindrical section 174. An annular surface 178 connects first cylindrical section 174 and second cylindrical section 176 that serves as a seat or abutment surface for sealing members 34.

Interior surface 172 includes a third cylindrical section 180 that is connected to second cylindrical surface 176 by another annular surface 182, which serves as a seat or abutment surface for bonnet washer 154. When bonnet washer 154 is seated against annular surface 182, seal members 34 are located between first annular surface 158 of bonnet washer 154 and annular surface 178 of bonnet 106, which prevents or at least substantially minimizes sealing members 34 from being displaced during engagement of conduit 20 with fitting 100. Although not necessarily required, bonnet 106 may also include a fourth cylindrical section 184 that is connected to third cylindrical section 180 by an annular sealing surface 186.

Annular sealing surface 186 is configured to engage nub 110 and deform nub 110 when bonnet 106 is fully engaged with hollow body 36. As noted above, when nub 110 is deformed, a seal is developed between bonnet 106 and hollow body 36. The seal developed between bonnet 106 and hollow body 36 is a beneficial aspect because a separate sealing member or gasket is not required, which reduces the number of parts and costs associated with manufacturing fitting assembly 100. In addition, the seal that is developed through deformation of nub 110 assists with increasing the sealing ability of the fitting assembly 100 when fitting assembly 100 is used in, for example, circuit 10 where the fluid that passes through the fitting assembly 100 is a refrigerant. In this regard, various refrigerants may include molecules that are smaller in comparison to other fluids such as, for example, water. The use of the seal developed by crushing nub 110 in combination with sealing members 34 prevents or at least substantially minimizes the small molecules of the refrigerant from escaping the fitting assembly 100 during use thereof.

In addition, with respect to the sealing ability provided by fitting assembly 100, it should be noted that sealing members 34 are located outboard from grip ring 118. This is a beneficial configuration in comparison to a configuration where the sealing member(s) are located inboard from the grip ring 118 from the standpoint that when conduit 20 is inserted into fitting assembly 100, the exterior surface of the conduit 20 will not be scratched or damaged by the grip ring 118 before coming into sealing contact with the sealing members 34. When the exterior surface of conduit 20 is scratched or damaged by the teeth 124 of grip ring 118, a fluid-tight seal between the sealing member 34 and the exterior surface of conduit 20 cannot necessarily be ensured. Thus, because sealing members 34 are placed in sealing engagement with the exterior surface of the conduit 20 before the exterior surface is gripped by grip ring 118, a fluid-tight seal between the exterior surface of the conduit 20 and sealing members 34 can be formed more reliably.

To assemble the second end 40 of fitting assembly 100, grip ring 118 is first inserted into hollow body 36 and annular lip 128 is seated against second annular shoulder 112. Bonnet washer 154 may then be inserted into hollow body 36 and seated against grip ring 118. Sealing members 34 may then be seated against annular surface 178 of bonnet 106, and bonnet 106 threadingly engaged with hollow body 36. During engagement between bonnet 106 and hollow body 36, bonnet washer 154 will seat against annular surface 182 and sealing members 34 will be properly located between bonnet washer 154 and bonnet 106. As bonnet 106 is tightly engaged with hollow body 36, nub 110 will deform and create a seal between hollow body 36 and bonnet 106 and complete formation of second end 40 of fitting assembly 100 will be achieved. The conduit 20 may then be inserted into the fitting assembly 100, after fitting assembly 100 has been secured to either inlet 22 or outlet 24 as set forth above relative to the fitting assembly 26.

As conduit 20 is inserted into fitting assembly 100, conduit 20 will slide past sealing members 34 and reach bonnet washer 154. While cylindrical surface 162 of bonnet washer 154 acts as a bearing surface for conduit 20, bonnet washer 154 may be slightly advanced forward toward grip ring 118. As conduit 20 reaches teeth 124, biting surfaces 146 of teeth 124 will engage the exterior surface conduit 20, but permit conduit 20 to advance until reaching protrusion 126 where conduit 20 can no longer advance into hollow body 36. Due to contact between sealing members 34 and the exterior surface of conduit 20, and the seal created due to deformation of nub 110, a leak-proof seal is achieved between the conduit 20 and the fitting assembly 100.

As noted above, when biting surfaces 146 of teeth 124 engage the exterior surface of conduit 20, conduit 20 is permitted to advance until reaching protrusion 126. This is because teeth 124 are angled in a direction toward protrusion 126. Teeth 124 being angled toward protrusion 126 also assists in preventing conduit 20 from being removed from fitting assembly 100 because if a force is exerted on conduit 20 to pull conduit 20 rearwardly or if a pressure within fitting assembly 100 reaches an extent that attempts to push conduit 20 rearwardly, the teeth 124 will further bite into the exterior surface of conduit 20. It should be understood, however, that when conduit 20 is formed of a relatively soft material such as copper or a polymeric material, the exterior surface of conduit can deform more easily. If a sufficient force is exerted on conduit 20 that is able to push or pull conduit 20 rearwardly, the teeth 124 may begin to deform by flattening out, which can cause teeth 124 to deform the exterior surface of conduit 20 radially inwardly.

If the force exerted on conduit 20 that pushes or pulls conduit 20 rearwardly continues to increase, there is the risk that teeth 124 may completely flatten out and deflect rearwardly to an extent that conduit 20 can be released from fitting assembly 100. Wedge 164 of bonnet washer 154 is designed to interfere with the ability of teeth 124 to flatten out and/or deflect rearwardly. As best shown in FIG. 6, there is some space between wedge 164 and teeth 126 of grip ring 118 that enables teeth 124 to deform and bite deeper into the exterior surface of conduit 20. Due to wedge 164 of bonnet washer 154, however, the teeth 124 are prevented from fully flattening out or deflecting to prevent conduit 20 from being removed from fitting assembly 100. Wedge 164, therefore, is configured to function as a support feature for teeth 124 during use of fitting assembly 100.

Now referring to FIGS. 8 to 11, a fitting assembly 200 is illustrated. Fitting assembly 200 is substantially similar to the fitting assembly 26 illustrated in FIGS. 2-4, but instead of having slip washer 30, fitting assembly 200 includes a ferrule 202. Features that are common between fitting assembly 26 and fitting assembly 200 include the same reference number, and will not be described in greater detail.

As shown in FIGS. 8-11, ferrule 202 is a frustoconical member 204 having a first surface 206 that faces and is designed to abut interior surface 44 of hollow body 36, and a second surface 208 that faces an exterior surface 210 of inlet or outlet 22, 24. A first axial end 212 has a diameter that is less than a second axial end 214. In addition, a split 216 separates opposing ends 218 of frustoconical member 204. First surface 206 is designed to abut interior surface 44. Thus, because first surface 206 is frusto-conically shaped, interior surface 44 of hollow body 36 may include a correspondingly shaped frustoconical abutment surface 220 that is located outboard from first cylindrical section 50.

Ferrule 202 may be formed of a material that is rigid, yet flexible so that opposing ends 218 may be separated from each other to widen split 216 and permit ferrule 202 to be placed around exterior surface 210 of inlet 22 or outlet 24. To attach fitting assembly 200 to inlet 22 or outlet 24, retaining nut 32 is detached from housing 28 and slid over inlet 22 or outlet 24. Housing 28 is then located over flared end 88 and pushed back relative to inlet 22 or outlet 24 until terminal end 58 abuts against shoulder 56 located within fitting body 36. Then, opposing ends 218 are separated from each other to widen split 216 and ferrule 202 is placed over inlet 22 or outlet 24.

After locating ferrule 202 around inlet 22 or outlet 24, housing 28 is pushed rearward relative to inlet 22 or outlet 24 such that inlet 22 or outlet 24 seats against shoulder 56. Ferrule 202 is then slid forward such that first surface 206 abut against a frusto-conically-shaped abutment surface 220 of first end 38 of housing 28. Retaining nut 32 is then slid forward and then threadingly mated with housing 28 such that ferrule 202 is sandwiched between abutment surface 220 of housing 28 and flange 73 of retaining nut 32. As retaining nut 32 is threadingly engaged to housing 28, the split 216 that was enlarged when placed about exterior surface 210 of inlet 22 or outlet 24 will narrow and ferrule 202 will be pushed forward such that first axial end 212 will seat against radially expanded section 88 of inlet 22 or outlet 24. As retaining nut 32 is further threadingly engaged to housing 28, second axial end 214 of ferrule 202 will be seated against flange 73 of retaining nut 32. By seating ferrule 202 between radially expanded section 88 and flange 73, movement of fitting 200 relative to inlet 22 or outlet 24 will be restricted.

After attaching fitting assembly 26 to inlet 22 outlet 24, conduit 20 may be inserted into second end 40 of housing 28 and past seal members 34. Then, a crimping tool (not shown) may be used to compress annular ridges 62 to rigidly attach housing 28 to conduit 20. Thus, conduit 20 may be placed in fluid communication with inlet 22 or outlet 24 of one of the heat exchangers 14 or 18 of circuit 10 without welding or brazing, without removing the flared end 88 of the inlet 22 or outlet 24, and in a quick and efficient manner.

While fitting assembly 200 has been described above as having a second end 40 that may be crimped using a crimping tool to secure fitting assembly 26 to conduit 20, it should be understood that the present disclosure should not be limited thereto and fitting assembly 200 may have a second end 40 like that illustrated in FIG. 6.

Lastly, while the fitting assemblies 26, 100, and 200 have been described above as being useful for attaching to an inlet 22 or outlet 24 of a component of a HVAC circuit 10, it should be understood that fitting assemblies 26, 100, and 200 may be useful for connecting any tube, pipe, or conduit that has a flared end to another tube, pipe, or conduit that does not have a flared end. In addition, the teachings of the present disclosure should not be limited to HVAC applications, and can be used to provide fluid communication for any type of fluid (e.g., gas or liquid) between a pair of pipes, tubes, or conduits.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fitting configured to connect an inlet or outlet of a fluid reservoir to a conduit, the inlet our outlet having a flared end having a diameter that is greater than a tube body of the inlet or the outlet, the fitting comprising:
    a housing having a first open end configured for receipt of the inlet or the outlet and a second open end configured for receipt of the conduit;
    a retaining nut configured to mate with first open end; and
    a slip washer configured to be sandwiched between the first open end of the housing and the retaining nut,
    wherein the slip washer is horseshoe-shaped and is configured to restrain movement of the fitting relative to the inlet or outlet, and
    wherein the housing includes an interior surface that, at the first open end, includes a first cylindrical section and a second cylindrical section that are separated by a radially outwardly recessed section that is configured for receipt of at least one annular seal member.

2. The fitting according to claim 1, wherein the slip washer includes a first end and a second end that are separated by a gap having a distance that corresponds to a diameter of the tube body of the inlet or the outlet, and the distance is less than a diameter of the flared end of the inlet or the outlet.

3. The fitting according to claim 1, wherein the first end includes a threaded surface that mates with an internally threaded surface of the retaining nut.

4. The fitting according to claim 3, wherein the retaining nut includes a radially inwardly extending annular flange that is configured to contact the slip washer when the slip washer is sandwiched between the first open end of the housing and the retaining nut.

5. The fitting according to claim 4, wherein the radially inwardly extending annular flange defines a through-hole having a diameter that is greater than the diameter of the flared end of the inlet or the outlet.

6. The fitting according to claim 1, wherein the second open end of the housing is configured to be crimped to secure the conduit positioned therein to the housing.

7. The fitting according to claim 6, wherein the second open end includes at least one outwardly extending ridge at an exterior surface of the housing and a correspondingly shaped recess at an interior surface of the housing, wherein the recess is configured for receipt of an annular seal member.

8. The fitting according to claim 1, wherein the second open end includes a threaded section, a first annular shoulder located inboard from the threaded section that extends radially inward, and a second annular shoulder located inboard from the first annular shoulder that extends radially inward;
    a grip ring having a plurality of flexible teeth positioned within the housing and configured to be seated against the second annular shoulder, the flexible teeth being configured to grip an exterior surface of the conduit;
    a bonnet configured to be seated against the first annular shoulder and having an exterior threaded surface that is configured to mate with the threaded section of the bore;
    a bonnet washer configured to be positioned between the grip ring and the bonnet; and
    a pair of seal members positioned between the bonnet washer and the bonnet that are configured to sealingly engage with the exterior surface of the conduit.

9. The fitting according to claim 8, wherein the first annular shoulder includes an annular nub that extends axially outward therefrom, the annular nub being configured to deform when the bonnet is seated against the first annular shoulder.

10. A fitting configured to connect a tube having a tube body and a flared end having a diameter that is greater than that of the tube body with a conduit, the fitting comprising:
    a housing having a first open end configured for receipt of at least the flared end of the tube and a second open end configured for receipt of the conduit;
    a retaining nut configured to mate with first open end; and
    a slip washer configured to be sandwiched between the first open end of the housing and the retaining nut,
    wherein the slip washer is horseshoe-shaped and is configured to restrain movement of the fitting relative to the tube, and
    wherein the housing includes an interior surface that, at the first open end, includes a first cylindrical section and a second cylindrical section that are separated by a radially outwardly recessed section that is configured for receipt of at least one annular seal member.

11. The fitting according to claim 10, wherein the slip washer includes a first end and a second end that are separated by a gap having a distance that corresponds to the diameter of the tube body, and the distance is less than the diameter of the flared end of the tube.

12. The fitting according to claim 10, wherein the first end includes a threaded surface that mates with an internally threaded surface of the retaining nut.

13. The fitting according to claim 12, wherein the retaining nut includes a radially inwardly extending annular flange that is configured to contact the slip washer when the slip washer is sandwiched between the first open end of the housing and the retaining nut.

14. The fitting according to claim 13, wherein the radially inwardly extending annular flange defines a through-hole having a diameter that is greater than the diameter of the flared end of the tube.

15. The fitting according to claim 10, wherein the second open end of the housing is configured to be crimped to secure the conduit positioned therein to the housing.

16. The fitting according to claim 15, wherein the second open end includes at least one outwardly extending ridge at an exterior surface of the housing and a correspondingly shaped recess at an interior surface of the housing, wherein the recess is configured for receipt of an annular seal member.

17. The fitting according to claim 10, wherein the second open end includes a threaded section, a first annular shoulder located inboard from the threaded section that extends radially inward, and a second annular shoulder located inboard from the first annular shoulder that extends radially inward;
- a grip ring having a plurality of flexible teeth positioned within the housing and configured to be seated against the second annular shoulder, the flexible teeth being configured to grip an exterior surface of the conduit;
- a bonnet configured to be seated against the first annular shoulder and having an exterior threaded surface that is configured to mate with the threaded section of the bore;
- a bonnet washer configured to be positioned between the grip ring and the bonnet; and
- a pair of seal members positioned between the bonnet washer and the bonnet that are configured to sealingly engage with the exterior surface of the conduit.

18. The fitting according to claim 17, wherein the first annular shoulder includes an annular nub that extends axially outward therefrom, the annular nub being configured to deform when the bonnet is seated against the first annular shoulder.

* * * * *